United States Patent [19]

Binnix

[11] Patent Number: 6,101,050
[45] Date of Patent: Aug. 8, 2000

[54] MIRROR AND ANTIQUING PROCESS FOR PRODUCING THE MIRROR

[75] Inventor: R. Justin Binnix, Arnold, Md.

[73] Assignee: Niermann Weeks Company, Inc., Millersville, Md.

[21] Appl. No.: 09/072,496

[22] Filed: May 5, 1998

[51] Int. Cl.[7] .............................. G02B 5/26; B05D 1/36; B05D 5/00
[52] U.S. Cl. .......................... 359/884; 427/269; 427/287
[58] Field of Search ................................ 427/165, 168, 427/269, 287; 359/884

[56] References Cited

U.S. PATENT DOCUMENTS

| | | | |
|---|---|---|---|
| Re. 1,883 | 2/1865 | Angenard | 427/165 |
| 689,526 | 12/1901 | Wagner et al. | 427/259 |
| 1,490,407 | 4/1924 | Vallely | 427/269 |
| 1,600,579 | 9/1926 | D'Arino | 427/269 |
| 1,788,562 | 1/1931 | Colbert et al. | 428/201 |
| 2,757,473 | 8/1956 | Gerlach | 427/259 |
| 3,861,989 | 1/1975 | Ashenfarb et al. | 427/165 |
| 4,093,754 | 6/1978 | Parsons | 427/259 |
| 4,133,919 | 1/1979 | Parsons | 427/259 |
| 4,199,358 | 4/1980 | Parsons | 430/308 |
| 4,252,891 | 2/1981 | Kostyshin et al. | 430/323 |
| 4,253,910 | 3/1981 | Mason et al. | 216/31 |
| 4,894,278 | 1/1990 | Servais et al. | 428/201 |
| 4,952,462 | 8/1990 | Bright | 428/542.2 |

*Primary Examiner*—Cassandra Spyrou
*Assistant Examiner*—Jennifer Winstedt
*Attorney, Agent, or Firm*—Millen, White, Zelano & Branigan, P.C.

[57] ABSTRACT

A mirror of an aged appearance is produced by antiquing an unaged mirror. The antiquing is accomplished by first removing a primer layer which overlies the silvered back of the mirror to expose a rear silvered surface. The rear silvered surface is then distressed by applying a patina which oxidizes the surface, preferably more in peripheral areas then in the interior area of the silvered back. A cardboard back panel which has been painted with a mixture of black paint, brown paint, and aluminum particles is then mounted against the distressed silver surface.

9 Claims, 3 Drawing Sheets

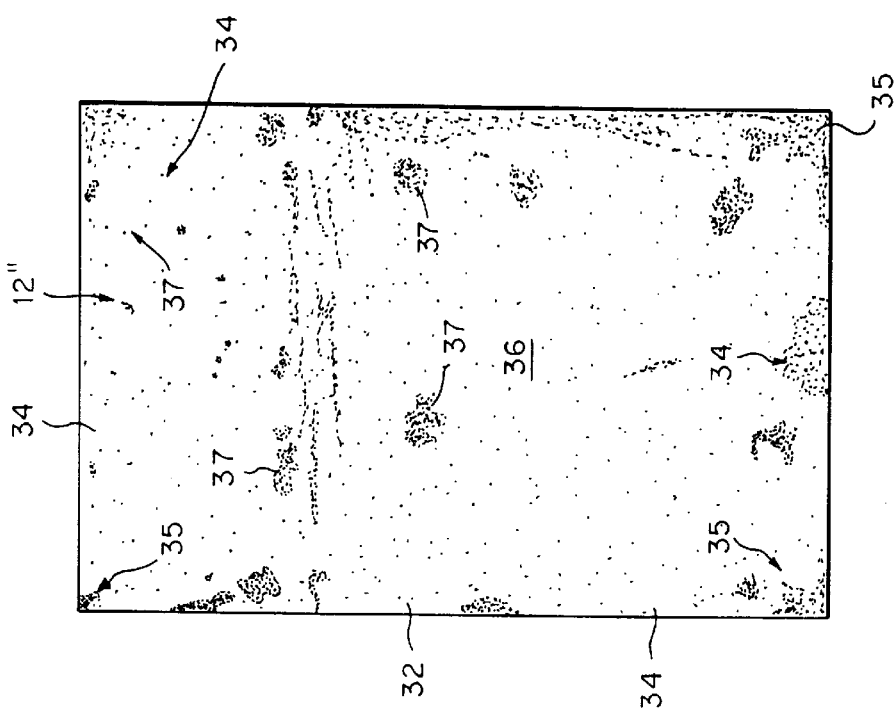
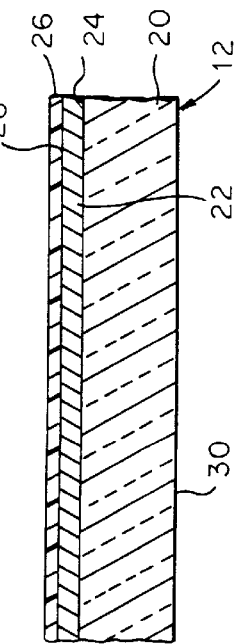
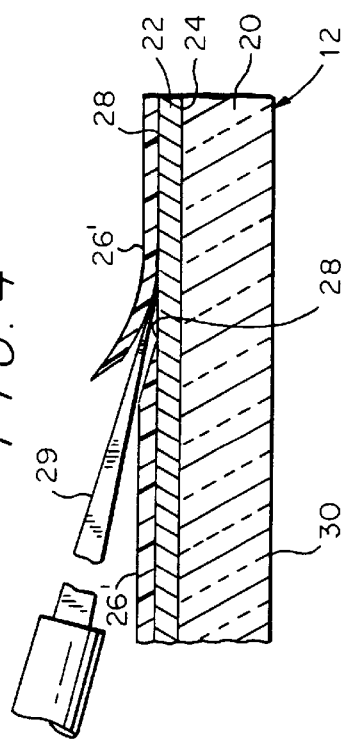
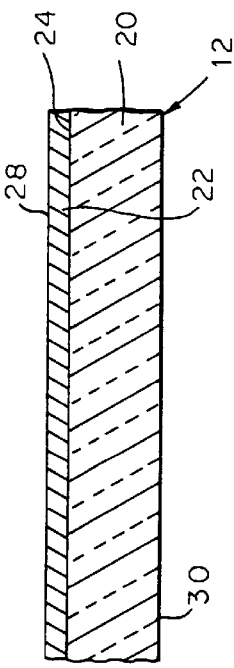

MIRROR AND ANTIQUING PROCESS FOR PRODUCING THE MIRROR

FIELD OF THE INVENTION

The present invention relates to mirrors and to antiquing processes for producing mirrors. More particularly, the present invention is directed to a relatively new mirror and to a process for altering the appearance of the new mirror so that the mirror appears aged.

BACKGROUND OF THE INVENTION

When purchasing most items, most customers prefer that the items are new when purchased, and that the items do not contain the defects which appear as the items age. This of course is not the case with antique furniture and furnishings, which preferably have some readily discernable indication of age. Accordingly, new furniture frequently is distressed so as to appear aged.

Since actual antiques can be extremely expensive and selected antique items are often unavailable, there has arisen a market for new furniture and furnishings, including chandeliers and mirrors, which have the appearance of a substantial age yet do not have the structural infirmities induced by age. When manufactured and finished with skill, these "new" antiques are highly prized by the knowledgeable public and are relatively expensive.

Mirrors present a special challenge. While technology is available for producing mirror frames which have the appearance of antiques, but do not have the structural problems frequently associated with antiques, the technology for producing appropriate glass for these mirrors has not to date been developed. Accordingly, both antique mirrors and mirrors having antiqued frames frequently have new glass, which of course, does not enhance the real or illusionary authenticity of the mirrors. With antique mirrors, it is not necessary or desirable to reflect a clear image of an observer, other mirrors being available for that purpose. Since mirror technology is almost universally directed to improving reflected images and to extending the life of the mirror, there is a need for methods of antiquing mirrors so that the mirrors will not be at odds with their frames.

SUMMARY OF THE INVENTION

It is a feature of the present invention to provide mirrors which do not initially have aged appearances with the characteristics of aged appearance so that the mirrors have at least the appearance of antiques.

In view of this feature and other features, the present invention is directed to a process for making a mirror appear older than it actually is, the process comprising the initial steps of removing primer paint from the back of the mirror to expose a layer of silver which is deposited directly on to the back of the mirror. If the new mirror does not have a primer layer, these initial steps are of course not necessary in practicing the invention. The silver layer is then distressed and a cardboard back panel installed adjacent to the silver layer, the cardboard back panel being coated in such a way to provide a general aged appearance when viewed through the glass and silver layer of the mirror.

In a more specific aspect of the invention, the silver layer is distressed mainly over peripheral areas of the mirror, including the corners of the mirror, with substantially less distressing over the interior area of the mirror.

In a still more specific aspect of the invention, the back panel has the surface facing the mirror which is coated with an uneven of black and brown paint and a reflective metal powder.

In still a further aspect of the invention, the silver layer is distressed by applying a patina irregularly to the silver surface of the mirror and rinsing the silver surface to remove the patina.

The invention is also directed to mirrors produced by the above describe steps.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 3 is a side elevation of a portion of the mirror of FIG. 1, enlarged with respect to FIGS. 1, 2, 6 and 9, prior to undergoing the processing steps of the present invention;

FIG. 4 is a view similar to FIG. 3 showing a primer coat being removed from a silver layer in an initial step of the process according to the present invention;

FIG. 5 is a view similar to FIG. 4 after the primer has been removed from the mirror;

FIG. 6 is a planar view of the back of the mirror with the primer removed and after the silver layer has been distressed;

DETAILED DESCRIPTION

Figure 1:
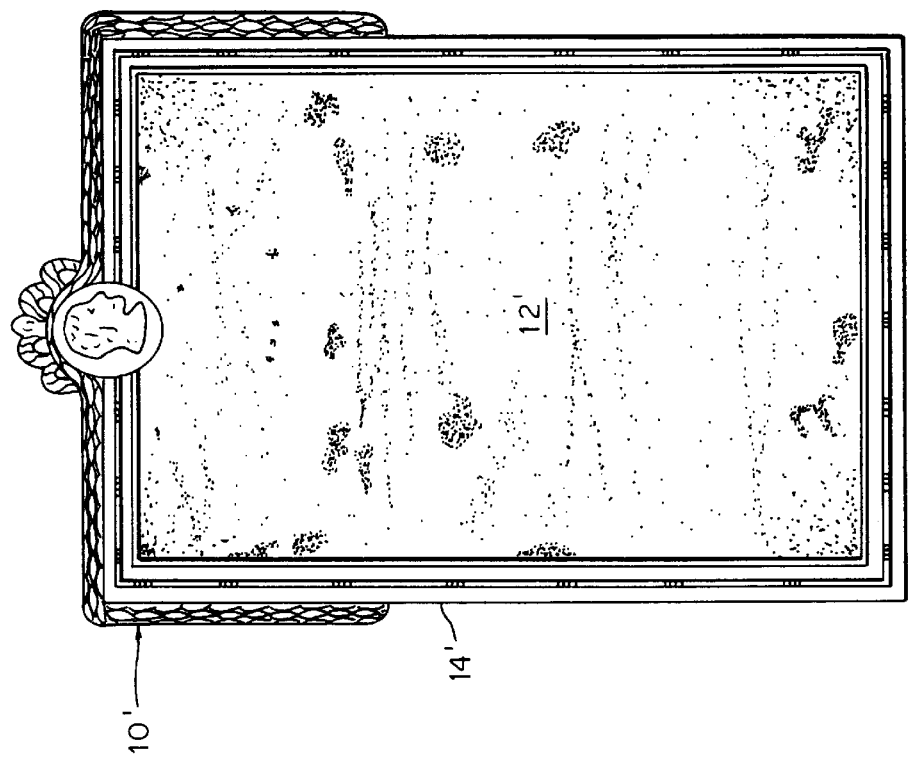
FIG. 1 is a front view of an unaged mirror which is to be antiqued in accordance with the principles of the present invention.

Referring now to FIG. 1, there is shown a conventional, purchased mirror assembly 10 comprised of a relatively new reflective mirror 12 and its frame 14. The mirror 12 is essentially flawless, so that the impression given by the mirror assembly 10 regardless of the frame's age is that the mirror assembly is of recent vintage, rather than antique.

Figure 2:
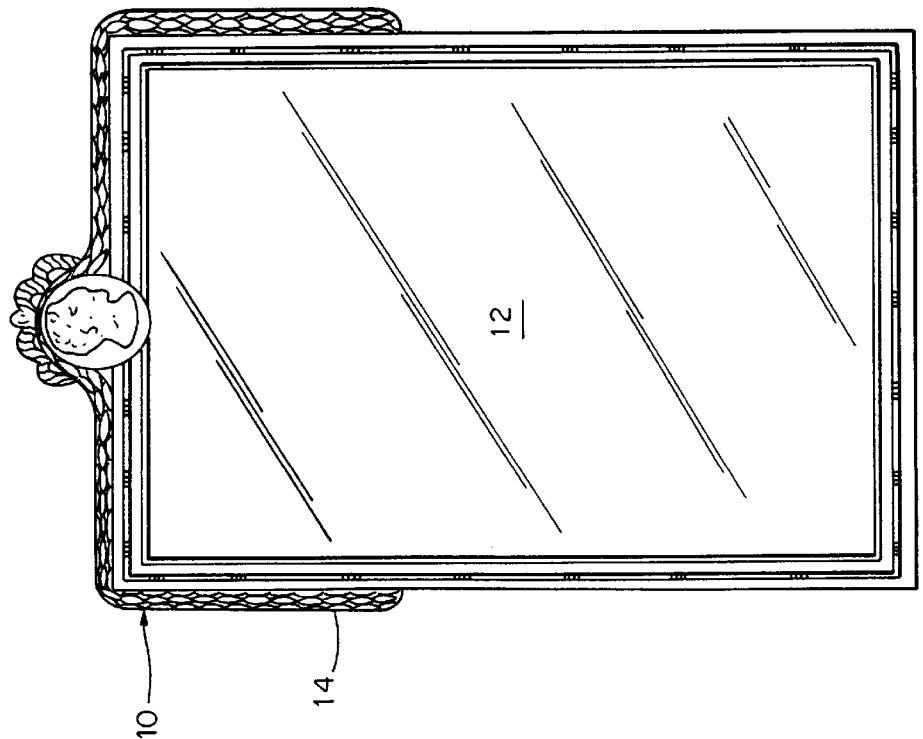
FIG. 2 is a view of an actual antique mirror.

Referring now to FIG. 2, there is shown an authentic antique mirror assembly 10' comprising an aged antique frame 14' and an aged mirror 12'. The antique assembly 10' of FIG. 2 is likely to have structural infirmities, such as loose frame joints and a delaminated back. In order to achieve the effect of the mirror assembly 10' of FIG. 2, in a new mirror, such as the mirror 10" of FIG. 9, the steps of FIGS. 3–8 are practiced.

Referring now to FIG. 3, it is seen that the mirror 12 (of FIG. 1) is comprised of a transparent glass pane glass 20, a thin layer of silver 22 deposited on the rear surface 24 of the glass pane 20, and a layer of primer 26 deposited on the rear surface 28 of the silver layer 22. The mirror 12 may be, for example, a standard purchased mirror of an appropriate size for the new frame 14 of FIG. 1 or the antique frame 14' of FIG. 2. In essence, the mirror 12 is a lamination which must be altered in order to achieve the appearance of the mirror 12' of FIG. 2. Standard mirrors 12 are widely available and relatively inexpensive, whereas an antique mirror 12' is expensive. Moreover, if an original antique mirror 12' has been broken, it is frequently difficult or impossible to find an antique mirror which will fit a particular antique frame 14'.

Since almost all standard purchased mirrors have a silver layer 22 covered by a primer coating 26, it is necessary to expose the rear surface 28 of the silver layer in order to process the silver layer. As is seen in FIG. 4, the mirror 12 is placed on a work table with its front face 30 down and with the primer layer 26 facing up. Generally, the primer layer is gray paint and may be removed partially by sanding. Preferably, sanding is done with 220 grit sandpaper and discontinued before penetrating the primer layer 26 to completely expose the back surface 28 of the silver layer. Thus, after sanding, there is a thin layer 26 of primer remaining. The dust from the sanding step is then cleaned off and a paint stripper, for example a chlorinated hydrocarbon type stripper such as Parks Pro Stripper available from the Parks Corporation of Fall River, Massachusetts, is applied generously with a brush. The stripper is allowed to soak completely into the thin remaining primer layer 26' by leaving the Stripper on for approximately 2 to 4 hours. After 2 to 4 hours, Parks Pro Stripper 1513 is again applied and allowed to soak overnight or for a period of 8 to 12 hours.

As is seen in FIG. 4, a hard rubber or plastic paint scrapper 29 is then used to scrape as much as possible of the primer layer 26' from the back surface 28 of the silver layer 22. In order to remove any of the primer layer 26' remaining after scraping more stripper, such as Parks Pro Stripper 1513, is applied and allowed to sit for 2 hours. After 2 hours, a plastic bristle brush is applied to the back of the mirror 12 in order to remove the stripper soaked, primer layer 26' remaining and to expose the rear surface 28 of the silver layer 22. All stripper and dirt is removed from the rear surface 28 of the silver layer 22 with window cleaner or another ammonia containing substance. By carefully performing the steps as described with respect to FIGS. 3 and 4, the primer layer 26 may be removed without damaging the silver layer 22. It is important that the integrity of the silver layer 22 is at least partially maintained so that what might be considered unattractive blotches do not occur in the finished mirror which might detract from the more pleasing and subtle tones of aging provided by the following distressing process.

Referring now to FIGS. 5 and 6, while the mirror 12 is lying on the front glass face 30 with the surface 28 of the silver layer 26 facing upwardly, a patina, for example, Muriatic acid (HCL 35% in water solution) such as straight GRIFFITH Silver-Black® patina available from Vulcan Materials Company, Birmingham, Ala., is applied with a brush, such as a 1½" brush, to the peripheral areas 34 and corners 35 of the surface 28. In order that the resulting distress of the silver layer 22 appears natural and not planned or painted, the patina is applied using erratic motions and erratic brush strokes. In that the patina works rapidly, the surface 28 is rinsed thoroughly with fresh water during application of the patina. Since authentic antique mirrors which have been aged tend to have most of the distressing on the peripheral areas 34 and corners 35 and not much distressing in the interior area 36 of the mirror 12", the resulting pattern resembles that of a gracefully aged mirror 12' (see FIG. 2). Once the desired antiquing appearance of the mirror 12" is attained, the entire surface 28 is rinsed again to remove all of the patina which has been brushed on. The excess water is then removed.

Diluted patina, for example, the aforementioned GRIFFITH SILVER-BLACK® patina, mixed as two parts patina to one part water, is then sprayed from a plastic spray bottle over the entire rear surface 28 of the mirror 12. More misting is applied to the peripheral areas 32 than in the interior area 36. The misting is not applied evenly since mirrors do not age evenly. When it is observed that the patina is starting to work, the rear surface 28 of the silver layer 22 is rinsed thoroughly.

The muriatic acid patina oxidizes the silver layer 22 in an uneven manner to create silver oxide areas which are visible to various extends through the glass pan 20.

Figure 8:
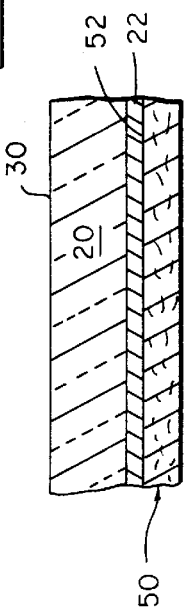
FIG. 8 is a cross-section of the mirror with the cardboard back installed thereover.
Figure 7:
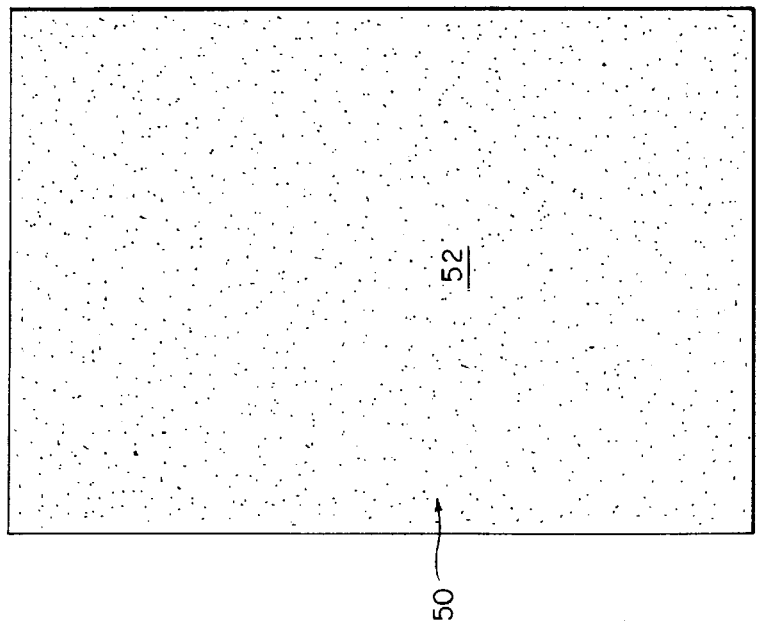
FIG. 7 is a planar view of a cardboard back panel treated in accordance with the principles of the present invention.

Referring now to FIGS. 7 and 8, a cardboard back panel 50 having a thickness of about ¼" is then cut to the same size and configuration as the mirror 12. While cardboard exemplifies a preferred material, the back panel 50 may be made of any appropriate sheet material which provides a separate layer. The front surface 52 of the cardboard back is painted with an uneven mixture of black and slightly greenish brown paint and a silvery white particulate. Exemplary of such a mixture is an uneven mixture of black and brown acrylic paint, such as that available from Binney & Smith Inc. of Easton, Pa., under the trademark LIQUITEX® and identified as 276 Mars Black, 331 Raw Umber. Aluminum powder is added into the paint mixture. Exemplary of suitable aluminum powder is a 97% Aluminum Flake mixture available from U.S. Aluminum, Inc. Flemington, N.J. After the paint has dried, it is sealed with a single spray coat of a catalyzed lacquer thinner. Exemplary of such a lacquer thinner is Lacquer Thinner #154-C315 available from the Sherwin-Williams Company, Cleveland, Ohio. The cardboard back panel 50 is then installed in engagement with the rear surface 28 of the silver layer 22 and held thereagainst in a conventional manner.

Figure 9:
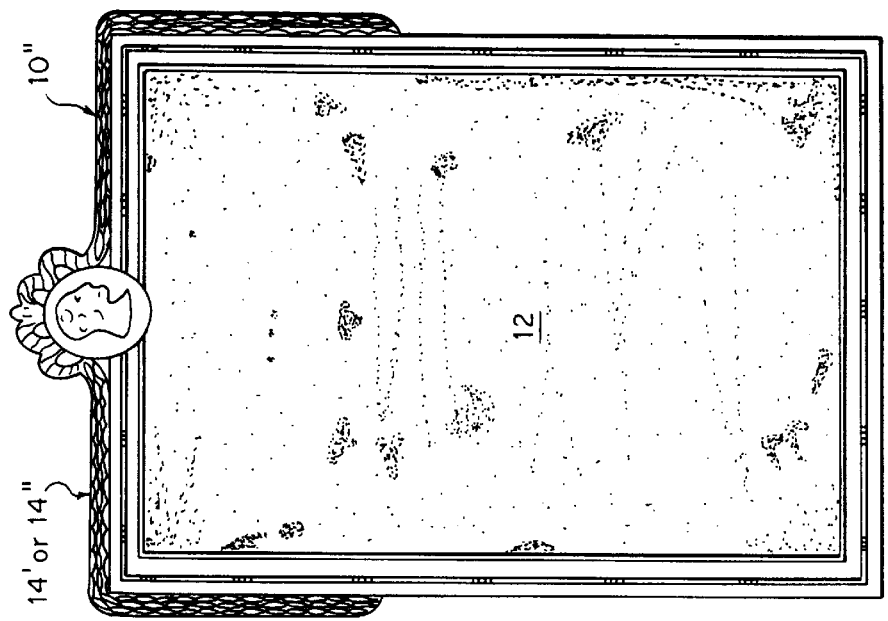
FIG. 9 is a planar view of a new mirror, antiqued in accordance with the principles of the present invention and mounted in either an antique frame or antiqued new frame.

The resulting mirror is the mirror 12" of FIG. 9 which has the appearance of an antique mirror, such as the antique mirror 12' of FIG. 2, but does not have the age. The antiqued mirror 12" is then mounted in a new frame 14 which has been worked to resemble an aged frame, or even in an actual antique frame 14', such as the frame of FIG. 2. In either case, the mirror 12" provides a mirror assembly 10' or 10" with an antique appearance.

While the disclosure is directed to modifying a standard purchased mirror 12 having a gray primer coat 26, it is within the scope of this invention to start with a mirror 12 configured as in FIG. 5 with a silver layer 22 having a back surface 28 which has never had a primer layer 26 applied thereto. In this case, the surface 28 is processed by distressing as previously described and illustrated in FIG. 6 and the back panel 50 is applied according to the discussion of FIGS. 7 and 8 to produce the mirror assembly 10" of FIG. 9 having the antiqued mirror 12".

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for providing an unaged mirror with an aged appearance, wherein the mirror includes a glass pane having a rear surface on which is deposited a silver layer having an exposed rear surface facing away from the pane, the method comprising:

distressing the metallic silver layer by applying muriatic acid thereto, rinsing the muriatic acid therefrom and covering the rear surface with a separate layer of material which is of a dark color and has a grainy texture.

2. The method of claim 1, wherein the silver layer deposited on the rear surface of the glass pane has peripheral area and an interior area, and wherein distressing is more densely performed over the peripheral area than from the interior area.

3. The method of claim 2, wherein the silver layer has a rear surface coated with a layer of primer and wherein the method includes the steps of stripping the primer down to the rear surface of the silver layer.

4. The method of claim 3, wherein stripping the primer comprises sanding the primer to reduce the thickness thereof without initially exposing the rear surface of the silver layer and then applying a chemical stripper to remove the remaining primer to expose the rear surface of the silver layer for subsequent distressing with muriatic acid.

5. The method of claim 4 wherein the separate layer of material is a panel.

6. The method of claim 5 wherein the panel is coated with an uneven mixture of black and raw umber paint and aluminum powder and coated with lacquer.

7. The method of claim 6 wherein the panel is cardboard.

8. The method of claim 2, wherein muriatic acid is initially brushed on and rinsed off the mirror and wherein muriatic acid is subsequently misted onto the mirror and rinsed off.

9. The method of claim 1, wherein muriatic acid is initially brushed on and rinsed off the mirror and wherein muriatic acid is subsequently misted on to the rear surface of the mirror and rinsed off.

* * * * *